Figure 1:
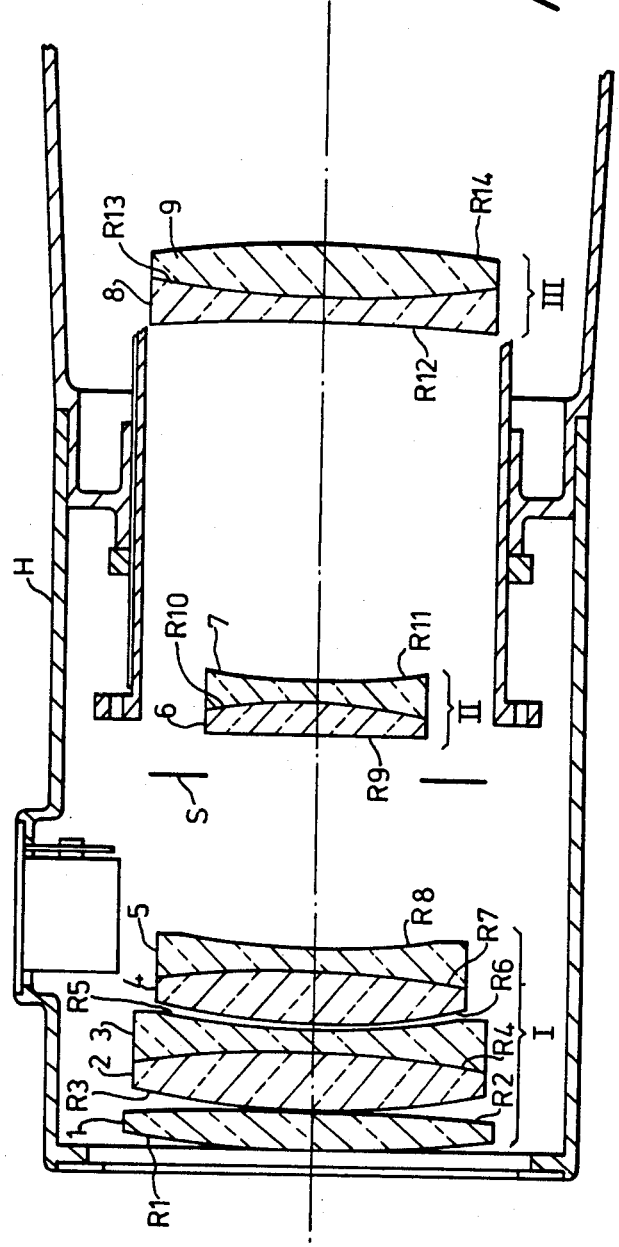

United States Patent [19]
Rogers

[11] 4,183,626
[45] Jan. 15, 1980

[54] LENSES

[75] Inventor: Philip J. Rogers, Clwyd, Wales

[73] Assignee: Pilkington P. E. Limited, St. Helens, England

[21] Appl. No.: 834,990

[22] Filed: Sep. 20, 1977

[30] Foreign Application Priority Data

Sep. 24, 1976 [GB] United Kingdom ............... 39882/76

[51] Int. Cl.² ............................................... G02B 9/60
[52] U.S. Cl. .................................................... 350/216
[58] Field of Search ......................................... 350/216

[56] References Cited

U.S. PATENT DOCUMENTS 3,236,151  2/1966  Solisch et al. .......................... 350/216

*Primary Examiner*—Paul A. Sacher
*Attorney, Agent, or Firm*—Mattern, Ware, Davis & Stoltz

[57] ABSTRACT

The invention provides a telephoto lens with a positive front group of lens elements, a negative middle group of lens elements and a rear positive part comprising a lens element or group of lens elements. The front group of elements includes at least one positive doublet consisting of a positive element of a crown glass type in front of a negative element of a flint glass type having a positive red relative partial dispersion coefficient deviation. The middle group of elements includes a positive lens element of a crown glass type and a negative lens element of a flint glass type having a positive red relative partial dispersion coefficient deviation. The rear element or group of elements may consist of a doublet component comprising a negative bi-concave element and a positive bi-convex element, the rear part of the telephoto lens being well separated from the negative middle part.

30 Claims, 2 Drawing Figures

LENSES

This invention concerns improvements in or relating to lenses and relates more particularly to telephoto lenses suitable for use, for example, in aerial reconnaissance photography.

Conventional telephoto lenses consisting essentially of a positive front member or group of lens elements and a negative rear member of group of lens elements generally require tight manufacturing tolerances and have a poor performance for some applications, and notably aerial reconnaissance photography. This arises from the requirement for the positive front and negative rear lens members or groups to have high power in order to achieve a low telephoto ratio, the need for the individual members or groups to be separately achromatised in order that longitudinal and lateral chromatic aberrations should be indentically zero, and the fact that the special glass types ("long" crown and "short" flint) often required in at least the positive front member or group of elements give very high individual lens element powers because of the relatively small difference in dispersion.

Prior U.S. Pat. No. 2,449,769 (Cox) provided an optical objective of the type comprising a divergent member located and spaced from two convergent members, the divergent member being in the form of a simple element and the rear convergent member being in the form of a doublet consisting of a biconvex convergent element cemented to a meniscus divergent element, whilst the front convergent member had two convergent components separated by a small air space. One of the components of the front member was compound and the other was a simple element, the overall axial length from the front surface of the front member to the rear focal plane being less than the equivalent focal length of the objective so that the objective had the characteristics of a telephoto objective.

Prior U.S. Pat. No. 2,452,909 (Cox) also disclosed an optical objective somewhat similar to that disclosed in U.S. Pat. No. 2,449,769. In U.S. Pat. No. 2,452,909 there is disclosed an optical objective corrected for spherical and chromatic aberrations, coma, astigmatism, field curvature and distortion, and comprising a simple divergent member, a front convergent member consisting of a cemented convergent doublet disposed in front of and slightly separated from a simple convergent component whose rear surface is axially separated from the front surface of the divergent member by an air space lying between 0.09 and 0.15 times the equivalent focal length of the objective, and a rear convergent member in the form of a doublet having a biconvex convergent element cemented in front of a meniscus divergent element made of a material having mean refractive index higher than and Abbe V number at least 10 higher than those of the material of the associated convergent element, the axial air separation between the divergent middle member and the convergent rear member being not less than half and not more than twice that between the divergent middle member and the convergent front member, the overall length from the front surface of the front member to the rear focal plane being less than the equivalent focal length of the objective.

According to the present invention there is provided a telephoto lens comprising a positive front group of lens elements including at least one positive doublet consisting of a positive element of a crown glass type in front of a negative element of a flint glass type having a positive red relative partial dispersion coefficient deviation, a negative middle group of lens elements comprising a positive lens element of a crown glass type and a negative lens elements of a flint glass type having a positive red relative partial dispersion coefficient deviation, and a rear positive part comprising a lens element or group of lens elements well separated from the negative middle group.

The red relative partial dispersion coefficient deviation ($\Delta Pcs$) of a glass has a value given by $$\Delta Pcs = Pcs \text{ (actual)} - Pcs \text{ (nominal)}$$

where $$Pcs \text{ (actual)} = (n_c - n_s)/(n_F - n_c)$$

wherein
- $n_c$ is the refractive index at wavelength $\lambda_c = 656.3$ nm
- $n_s$ is the refractive index at wavelength $\lambda_s = 852.1$ nm
- $n_F$ is the refractive index at wavelength $\lambda_F = 486.1$ nm and $$Pcs \text{ (nominal)} = 0.4029 + 0.002331 V.$$

The rear positive part of the lens, whose separation from the negative middle group may be the largest air gap in the lens and may be in the range 0.12 F to 0.24 F where F is the focal length of the complete lens, may consist of a single positive lens element of a high refractive index flint glass type, for example having a refractive index in the range 1.64 to 1.76 and a constringence, or V value, in the range 36 to 31. Preferably, however, the rear positive part of the lens consists of a doublet, which may but need not necessarily be a cemented doublet, comprising a negative lens element in front of a positive lens element, the negative element being of a glass type having a lower refractive index (e.g. in the range 1.50 to 1.63) and a higher V value (e.g. in the range 61 to 38) than the glass type of the positive element (which may have a refractive index in the range 1.68 to 1.76 and a V value in the range 45 to 29). The glass type of the negative element preferably has a red relative partial dispersion coefficient deviation which is more negative than that of the glass type of the positive element.

In the positive front group of the lens said positive lens element is preferably of a crown glass type having a negative red partial dispersion coefficient deviation. Said positive and negative lens elements forming said doublet in the front group are preferably, but need not necessarily be, cemented together to form a cemented doublet. The crown glass type of the positive lens element may have a refractive index in the range 1.55 to 1.65 and a V value in the range 57 to 65, and the flint glass type of the negative lens element may have a refractive index in the range 1.52 to 1.62 and a V value in the range 44 to 52. Preferably the positive front group of the lens consists of five lens elements arranged to form three components consisting of a singlet positive element (which may have a refractive index in the range 1.48 to 1.63 and a V value in the range 58 to 71), and two positive doublets as set forth above.

In the negative middle group of the lens said positive lens element is preferably of a crown glass type having a negative red partial dispersion coefficient deviation. Said positive and negative lens elements in the middle group are preferably, but need not necessarily be, cemented together. The crown glass type of the positive element may have a refractive index in the range of 1.60 to 1.70 and a V value in the range 54 to 61, and the flint glass type of the negative element may have a refractive index in the range of 1.61 to 1.66 and a V value in the range 44 to 39. Preferably the negative middle group of the lens consists of two elements, namely said positive and negative elements.

The focal length of the positive front group of the lens may be in the range +0.37F to +0.50F, the focal length of the the negative middle group in the range −0.30F to −0.37F, and the focal length of the positive rear part in the range of +0.75F to +1.60F.

Typically a lens in accordance with the invention can give diffraction limited imagery over a spectral bandwidth of 580 to 720 nanometers, a field of view of 17 degrees, an aperture of F/8, a nominal focal length of 1000 mm, and a nominal front vertex to image plane distance of 0.95F.

Figure 2:
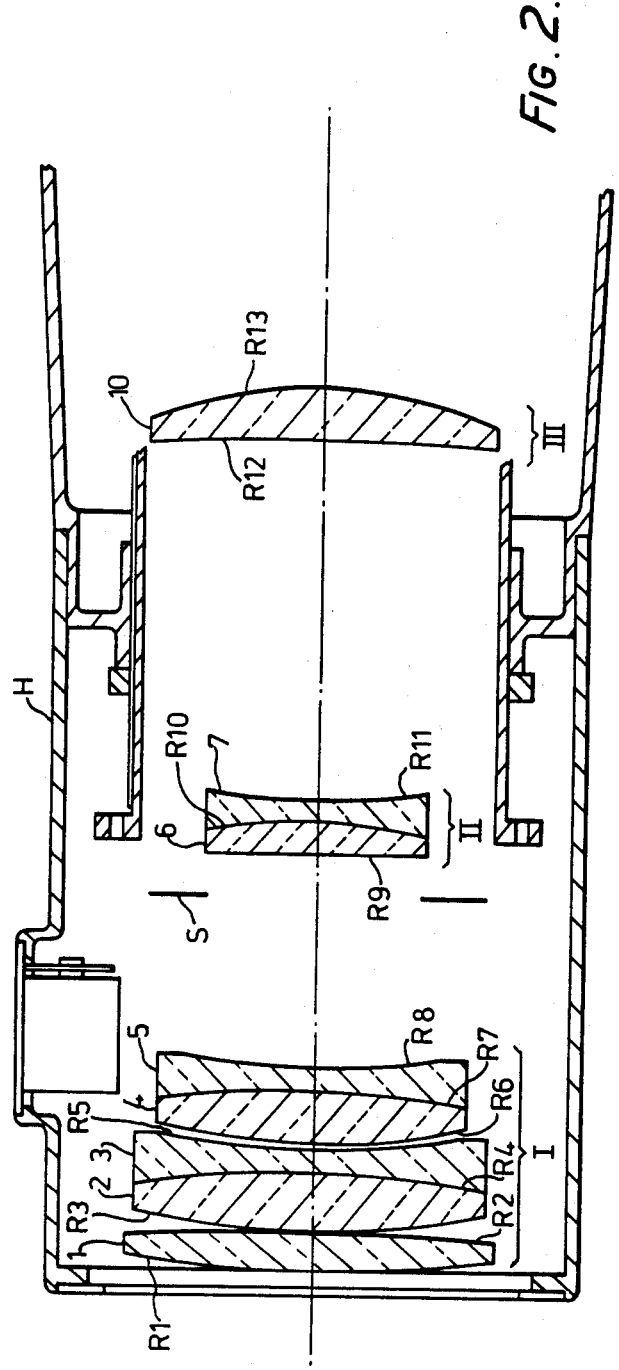

Embodiments of lens in accordance with the invention will now be described, by way of example, with reference to the accompanying drawings in which:

FIG. 1 is a schematic representation of a first embodiment of telephoto lens, and FIG. 2 is a schematic representation of a second embodiment.

The embodiment of lens shown in FIG. 1 comprises a positive front group I of lens elements 1, 2, 3, 4 and 5, a negative middle group II of lens elements 6 and 7, and a positive back group III of lens elements 8 and 9, contained in a housing generally indicated as H and having an aperture stop S between the groups I and II but nearer to the group II.

The five elements in the positive front group I consist of a positive singlet element 1, which is shown as biconvex but which may be convex-plano or slightly meniscus convex towards the front, and two positive doublets consisting respectively of the lens elements 2 and 3 and the lens elements 4 and 5. The elements 2 and 4 are positive bi-convex elements and the elements 3 and 5 are negative bi-concave elements. The doublets are preferably, but not necessarily, cemented doublets, i.e. the element 2 is preferably cemented to the element 3 and the element 4 is preferably cemented to the element 5. The negative lens elements 3 and 5 in both doublets are made of a flint glass type having a positive relative partial dispersion coefficient deviation at the red end of the visible spectrum while the positive lens elements 2 and 4 of the doublets are made of a crown glass type preferably having a negative red partial dispersion coefficient deviation.

The two lens elements 6 and 7 constituting the negative middle group II consist of a slightly meniscus positive element 6 concave towards the front and a bi-concave negative element 7 which is preferably, but not necessarily, cemented to the element 6. The positive element 6 is made of a crown glass type preferably having a negative red partial dispersion coefficient deviation. The negative element 7 is made of a flint glass type having a positive red partial dispersion coefficient deviation.

The back lens group III consists of a doublet component comprising a negative bi-concave element 8 and a positive bi-convex element 9. The glass type used for the negative element 8 has a lower refractive index and a higher V value than the glass type of the positive element 9. Further, the glass type of the negative element 8 preferably has a red relative partial dispersion coefficient that is more negative than that of the glass type used for the positive element 8. Thus the negative element 8 is preferably of a flint glass with long partials while the positive element 9 is of a more dispersive flint glass with short partials.

The refractive indices and the constringences, or V values, of the glass types used for the individual lens elements preferably lie within the following ranges:

| Element | Refractive Index | V value |
|---------|------------------|---------|
| 1 | 1.48 to 1.63 | 58 to 71 |
| 2 | 1.55 to 1.65 | 57 to 65 |
| 3 | 1.52 to 1.62 | 44 to 52 |
| 4 | 1.55 to 1.65 | 57 to 65 |
| 5 | 1.52 to 1.62 | 44 to 52 |
| 6 | 1.60 to 1.70 | 54 to 61 |
| 7 | 1.61 to 1.66 | 44 to 39 |
| 8 | 1.50 to 1.63 | 61 to 38 |
| 9 | 1.68 to 1.76 | 45 to 29 |

The embodiment of lens shown in FIG. 2 is essentially similar to that shown in FIG. 1 with respect to the front and middle groups I and II, and the same numerals are used to indicate the same elements. In the embodiment of FIG. 2, however, the back group or part III consists of a singlet positive element 10 which is meniscus concave towards the front, instead of the doublet 8/9 in the FIG. 1 embodiment. The singlet positive element 10 is made of a high refractive index flint glass type, and may have a refractive index in the range 1.64 to 1.76 and a V value in the range 36 to 31. The doublet construction for the back part III as provided in the FIG. 1 embodiment is, however, preferred since it allows greater control over zonal coma and secondary lateral chromatic aberration.

In the embodiments of both FIGS. 1 and 2 the back part III is well separated from the middle group II, the air space between them preferably being the longest air space in the lens and the separation preferably being in the range 0.12F to 0.24F (where F is the focal length of the complete lens).

In order to achieve a reasonably low telephoto ratio the power of the positive back part III is limited to a medium value. Preferably the focal lengths of the three parts of the lens lie within the following ranges:

| Group or Part | Focal Length |
|---------------|--------------|
| I | +0.37F to +0.50F |
| II | −0.30F to −0.37F |
| III | +0.75F to +1.60F |

It will be seen that the embodiments of both FIGS. 1 and 2 are basically of telephotic construction having a leading positive lens group I in front of a negative lens group II, but with a further positive part or lens group III placed at the rear of the complete lens and well separated from the negative lens group II.

It has been found that conventional telephoto lenses tend to have poor performance and require tight manufacturing tolerances for some applications, and particularly for photographic aerial reconnaissance. This arises essentially from three factors, namely (i) a low telephoto ratio requires high powered positive front and negative rear lens groups, (ii) the individual groups must be separately achromatised in order that longitudinal and lateral chromatic aberrations should be identically zero and (iii) the special glass types ("long" crown and "short" flint) required in at least the positive front group give very high individual lens element powers due to their relatively small difference in dispersion.

By an arrangement in accordance with the present invention the need for separate achromatisation of the positive front and negative rear lens groups can be avoided and hence the powers required of the individual lens elements can be reduced. In particular, if the positive front lens group I is only semi-acrhomatised to the point where its chromatic aberration is about halfway between non-achromatised and fully achromatised, then the required powers of the individual lens elements forming the group are reduced by about 40%. Further, the intrinsic chromatic aberration of the negative middle group II (corresponding to the negative rear group of a conventional telephoto lens) is enhanced by combining a powerful flint negative lens element with a weaker crown positive element. The resultant chromatic aberration contributions of the two groups (assuming an aperture stop) in its normal position between the two groups, but slightly nearer the rear group) are, with respect to transverse primary longitudinal chromatic aberration, a medium value negative contribution from the positive front group I and a large value positive contribution from the negative middle group II, and, with respect to transverse primary lateral chromatic aberration, a medium value positive contribution from both the positive front group I and the negative middle group II. This gives a residual medium value positive longitudinal and a residual large value positive lateral, which are countered by the positive back part III of the lens whose position well spaced from the negative group II and from the aperture stop results in a relatively small image ray height but a relatively large principal ray height and which is of medium power, its power being limited as it would otherwise raise the telephoto ratio by too large a factor.

In the embodiment described above with reference to FIG. 2, the residual primary chromatic aberration is countered by the singlet positive element 10 of a high refractive index flint glass type providing the back part III.

In the preferred embodiment described above with reference to FIG. 1, the back part III has its intrinsic chromatic aberration enhanced by use of a positive flint element 9 and a weaker negative element 8 also of a flint glass type but of lower dispersion than the glass of the positive element 9. This doublet component thus contributes a medium amount of negative primary longitudinal chromatic aberration and a large amount of negative primary lateral chromatic aberration, which combined with the residuals from the front two groups I and II gives overall correction of both types of primary chromatic aberration.

In order to minimise secondary longitudinal colour "long" crown and "short" flint glasses are used in both the positive front lens group I and the negative middle lens group II. The latter is contrary to normal practice but is used in the present case since the negative power lens group II is not achromatised by use of a crown negative with a flint positive, but instead has its chromatic contribution enhanced by using a flint negative with a crown positive. This results in increased secondary longitudinal chromatic aberration from the group II but of opposite sign to that from the front group I.

The front and middle lens groups I and II, and in particular group II, introduce secondary lateral chromatic aberrations. These contributions add since the optical powers of the two groups are of opposite sign and because of their opposed positions with respect to the aperture stop, the effect being exaggerated by the increased secondary colour from the negative group-II. This secondary lateral chromatic aberration causes images at the extreme wavelengths to be smaller than that at the central wavelength.

To improve off-axis imagery this secondary lateral chromatic aberration can be reduced by use of a doublet component for the positive back lens part III as described above with reference to the FIG. 1 embodiment, i.e. a doublet using a flint glass with long partials for the negative lens element and a more dispersive flint glass with short partials for the positive lens element. It will be seen that this is contrary to the requirement that the back lens part III should not contribute much secondary longitudinal colour. However, compared with the image ray, the principal ray is further away from the optical axis in the back lens part III than in either of the front and middle groups I and II. Any aberration contribution given by the back part III will, therefore, be greater off-axis than on. The glass types for the doublet component providing the back part III are thus chosen to reduce secondary lateral chromatic aberration rather than to limit the contribution of secondary longitudinal colour.

Specific examples of lenses in accordance with the invention and designed to give diffraction-limited imagery over a spectral bandwidth of 580 to 720 nanometers have numerical data as follows, the dimensional units being millimeters but it being understood that the values are relative and can be scaled accordingly: Examples 1.1 to 1.5 are in accordance with the FIG. 1 embodiment while Examples 2.1 to 2.3 are in accordance with the FIG. 2 embodiment. It will be noted, however, that the front element 1 is meniscus in Example 1.2 and convex-plano in Examples 1.3 and 2.2 as distinct from bi-convex as shown in FIGS. 1 and 2. The successive surfaces of the lens elements are indicated as R1 to R14 in the examples relating to FIG. 1 and R1 to R13 in the examples relating to FIG. 2. It will be seen that Examples 1.1, 1.4 and 1.5 include an element P, which is a film register plate not shown in the drawings, and whose surfaces are indicated by R15 and R16.

EXAMPLE 1.1

| Element | Surface | Radius of Curvature | Axial Thickness Separation |
|---|---|---|---|
| 1 | R1 | +554.569 | |
| | | | 15.710 |
| | R2 | −5095.532 | |
| | | | 0.949 |
| 2 | R3 | +363.064 | |
| | | | 24.173 |
| | R4 | −434.489 | |
| 3 | | | 10.900 |
| | R5 | +434.489 | |
| | | | 0.949 |
| 4 | R6 | +263.990 | |
| | | | 21.516 |
| | R7 | −514.042 | |
| 5 | | | 10.615 |
| | R8 | +337.023 | |
| | | | 87.403 |
| 6 | R9 | −5095.532 | |
| | | | 12.807 |
| | R10 | −303.478 | |
| 7 | | | 8.813 |

-continued

| | | | |
|---|---|---|---|
| | R11 | +221.990 | |
| | | | 148.888 |
| 8 | R12 | −1119.114 | |
| | | | 11.460 |
| | R13 | +514.042 | |
| 9 | | | 21.602 |
| | R14 | −514.042 | |
| | | | 573.722 |
| | R15 | PLANO | |
| P | | | 6.024 |
| | R16 | PLANO | |

| Element | Refractive Index Nd | Constringence V | Diameter | ΔPcs |
|---|---|---|---|---|
| 1 | 1.60311 | 60.60 | | −.0009 |
| 2 | 1.56384 | 60.80 | | −.0016 |
| 3 | 1.55115 | 49.68 | | +.0064 |
| 4 | 1.56384 | 60.80 | | −.0016 |
| 5 | 1.55115 | 49.68 | | +.0064 |
| | | | 106.9 | |
| 6 | 1.60311 | 60.60 | | −.0009 |
| 7 | 1.61340 | 44.30 | | +.0182 |
| 8 | 1.53375 | 55.31 | | −.0054 |
| 9 | 1.68273 | 44.50 | | −.0022 |
| | | | 139.1 | |
| P | 1.52249 | 59.48 | | |

F = 1000, Aperture F/8, 17.2 Degrees Field of View
Stop Position : 69.9 after R8
$\frac{FVD}{F} = 0.954$ (excluding film register plate P)
Lens group focal lengths:

| I | II | III |
|---|---|---|
| +0.46F | −0.34F | +0.88F |

EXAMPLE 1.2

| Element | Surface | Radius of Curvature | Axial Thickness/ Separation |
|---|---|---|---|
| 1 | R1 | +618.814 | |
| | | | 13.502 |
| | R2 | +1431.630 | |
| | | | 0.450 |
| 2 | R3 | +439.747 | |
| | | | 20.253 |
| | R4 | −933.589 | |
| 3 | | | 9.451 |
| | R5 | +751.991 | |
| | | | 0.450 |
| 4 | R6 | +348.385 | |
| | | | 20.253 |
| | R7 | −1172.248 | |
| 5 | | | 9.452 |
| | R8 | +552.375 | |
| | | | 122.105 |
| 6 | R9 | −41955.367 | |
| | | | 12.377 |
| | R10 | −294.407 | |
| 7 | | | 9.001 |
| | R11 | +220.165 | |
| | | | 123.095 |
| 8 | R12 | −29230.328 | |
| | | | 9.452 |
| | R13 | +286.063 | |
| 9 | | | 22.504 |
| | R14 | −907.402 | |
| | | | 577.361 |

| Element | Refractive Index Nd | Constringence V | Diameter | Δ Pcs |
|---|---|---|---|---|
| 1 | 1.62090 | 60.31 | 149.6 | −.0094 |
| 2 | 1.64250 | 57.96 | | −.0021 |
| 3 | 1.61310 | 44.34 | | +.0240 |
| 4 | 1.64250 | 57.96 | | −.0021 |
| 5 | 1.61310 | 44.34 | | +.0240 |
| 6 | 1.69100 | 54.78 | | +.0087 |
| 7 | 1.65412 | 39.63 | | +.0166 |
| 8 | 1.62606 | 38.96 | | −.0032 |
| 9 | 1.74950 | 34.95 | 145.7 | +.0076 |

F = 1000, Aperture F/8, 16.5 Degrees Field of View
Stop Position : 73.3 after R8
$\frac{FVD}{F} = 0.950$
Lens group focal lengths:-

| I | II | III |
|---|---|---|
| +0.49F | −0.35F | +0.82F |

EXAMPLE 1.3

| Element | Surface | Radius of Curvature | Axial Thickness/ Separation |
|---|---|---|---|
| 1 | R1 | +576.371 | |
| | | | 14.064 |
| | R2 | PLANO | |
| | | | 0.938 |
| 2 | R3 | +359.618 | |
| | | | 22.972 |
| | R4 | −715.098 | |
| 3 | | | 11.017 |
| | R5 | +377.482 | |
| | | | 0.938 |
| 4 | R6 | +271.054 | |
| | | | 23.441 |
| | R7 | −957.200 | |
| 5 | | | 10.314 |
| | R8 | +345.959 | |
| | | | 92.046 |
| 6 | R9 | −2119.242 | |
| | | | 12.189 |
| | R10 | −202.105 | |
| 7 | | | 8.907 |
| | R11 | +244.869 | |
| | | | 156.649 |
| | R12 | −3164.588 | |
| 8 | | | 11.134 |
| | R13 | +630.793 | |
| 9 | | | 22.902 |
| | R14 | −557.930 | |
| | | | 580.918 |

| Element | Refractive Index Nd | Constringence V | Diameter | ΔPcs |
|---|---|---|---|---|
| 1 | 1.55671 | 58.65 | 125.3 | −.0054 |
| 2 | 1.60311 | 60.60 | | −.0009 |
| 3 | 1.52944 | 51.68 | | +.0133 |
| 4 | 1.60311 | 60.60 | | −.0009 |
| 5 | 1.52944 | 51.68 | | +.0133 |
| 6 | 1.60729 | 59.46 | | −.0033 |
| 7 | 1.65412 | 39.63 | | +.0166 |
| 8 | 1.56384 | 60.80 | | −.0016 |
| 9 | 1.70181 | 41.01 | | +.0065 |
| | | | 166.0 | |

F = 1000, Aperture F/8, 17.2 Degrees Field of View
Stop Position : On R8
$\frac{FVD}{F} = 0.968$
Lens group focal lengths:

| I | II | III |
|---|---|---|
| +0.45F | −0.31F | +0.78F |

EXAMPLE 1.4

| Element | Surface | Radius of Curvature | Axial Thickness/ Separation |
|---|---|---|---|
| 1 | R1 | +578.008 | |
| | | | 15.874 |
| | R2 | −7066.554 | |
| | | | 0.937 |
| 2 | R3 | +315.448 | |
| | | | 23.201 |
| | R4 | −546.623 | |
| 3 | | | 11.013 |

-continued

| | Surface | Radius | Axial Thickness/Separation |
|---|---|---|---|
| | R5 | +396.609 | |
| | | | 0.937 |
| | R6 | +234.813 | |
| 4 | | | 21.003 |
| | R7 | −606.080 | |
| 5 | | | 10.310 |
| | R8 | +366.945 | |
| | | | 56.213 |
| | R9 | +2232.155 | |
| 6 | | | 12.944 |
| | R10 | −361.749 | |
| 7 | | | 8.904 |
| | R11 | +181.980 | |
| | | | 239.022 |
| | R12 | −1815.223 | |
| 8 | | | 10.257 |
| | R13 | +24920.426 | |
| 9 | | | 19.404 |
| | R14 | −719.289 | |
| | | | 480.735 |
| | R15 | PLANO | |
| P | | | 6.106 |
| | R16 | PLANO | |

| Element | Refractive Index Nd | Constringence V | Diameter | ΔPcs |
|---|---|---|---|---|
| | | | 136.1 | |
| 1 | 1.60311 | 60.60 | | −.0009 |
| 2 | 1.55232 | 63.46 | | +.0049 |
| 3 | 1.52944 | 51.68 | | +.0133 |
| 4 | 1.55232 | 63.46 | | +.0049 |
| 5 | 1.52944 | 51.68 | | +.0133 |
| 6 | 1.64250 | 57.96 | | −.0021 |
| 7 | 1.61340 | 44.30 | | +.0182 |
| 8 | 1.58267 | 46.47 | | −.0042 |
| 9 | 1.69895 | 30.07 | | −.0020 |
| | | | 163.2 | |
| P | 1.52249 | 59.48 | | |

F = 1000, Aperture F/8, 17.2 Degrees Field of View
Stop Position : 50.6 after R8
$\frac{FVD}{F} = 0.952$ (excluding film register plate P)
Lens group focal lengths:
$\frac{I}{+0.38F} \quad \frac{II}{-0.34F} \quad \frac{III}{+1.53F}$

EXAMPLE 1.5

| Element | Surface | Radius of Curvature | Axial Thickness/Separation |
|---|---|---|---|
| | R1 | +574.378 | |
| 1 | | | 15.874 |
| | R2 | −4226.620 | |
| | | | 0.937 |
| | R3 | +346.447 | |
| 2 | | | 23.200 |
| | R4 | −1149.730 | |
| 3 | | | 11.013 |
| | R5 | +417.488 | |
| | | | 0.937 |
| | R6 | +263.895 | |
| 4 | | | 21.002 |
| | R7 | −797.303 | |
| 5 | | | 10.310 |
| | R8 | +379.144 | |
| | | | 72.279 |
| | R9 | −14527.902 | |
| 6 | | | 12.943 |
| | R10 | −210.254 | |
| 7 | | | 8.904 |
| | R11 | +211.793 | |
| | | | 158.036 |
| | R12 | −1393.439 | |
| 8 | | | 10.257 |
| | R13 | +487.395 | |
| 9 | | | 24.421 |
| | R14 | −656.613 | |
| | | | 591.834 |
| | R15 | PLANO | |
| P | | | 6.105 |
| | R16 | PLANO | |

| Element | Refractive Index Nd | Constringence V | Diameter | Δ Pcs |
|---|---|---|---|---|
| | | | 142.7 | |
| 1 | 1.56384 | 60.80 | | −.0016 |
| 2 | 1.56384 | 60.80 | | −.0016 |
| 3 | 1.55115 | 49.68 | | +.0064 |
| 4 | 1.56384 | 60.80 | | −.0016 |
| 5 | 1.55115 | 49.68 | | +.0064 |
| 6 | 1.64050 | 60.10 | | +.0026 |
| 7 | 1.61340 | 44.30 | | +.0182 |
| 8 | 1.51112 | 60.41 | | 0 |
| 9 | 1.68273 | 44.50 | | −.0022 |
| | | | 136.9 | |
| P | 1.52249 | 59.48 | | |

F = 1000, Aperture F/8, 17.2 Degrees Field of View
Stop Position : 65.1 after R8
$\frac{FVD}{F} = 0.966$ (excluding film register plate P)

Lens Group focal lengths:
$\frac{I}{+0.44F} \quad \frac{II}{-0.36F} \quad \frac{III}{+0.98F}$

EXAMPLE 2.1

| Element | Surface | Radius of Curvature | Axial Thickness/Separation |
|---|---|---|---|
| | R1 | +571.386 | |
| 1 | | | 14.063 |
| | R2 | −10616.463 | |
| | | | 0.938 |
| | R3 | +357.565 | |
| 2 | | | 22.970 |
| | R4 | −575.682 | |
| 3 | | | 11.016 |
| | R5 | +407.930 | |
| | | | 0.938 |
| | R6 | +265.880 | |
| 4 | | | 21.008 |
| | R7 | −740.998 | |
| 5 | | | 10.313 |
| | R8 | +370.893 | |
| | | | 75.111 |
| | R9 | −2797.902 | |
| 6 | | | 12.188 |
| | R10 | −215.891 | |
| 7 | | | 8.907 |
| | R11 | +219.566 | |
| | | | 193.549 |
| | R12 | −3839.145 | |
| 10 | | | 14.063 |
| | R13 | −628.030 | |
| | | | 559.553 |

| Element | Refractive Index Nd | Constringence V | Diameter | Δ Pcs |
|---|---|---|---|---|
| | | | 141.8 | |
| 1 | 1.55671 | 58.65 | | −.0054 |
| 2 | 1.60311 | 60.60 | | −.0009 |
| 3 | 1.55115 | 49.68 | | +.0064 |
| 4 | 1.60311 | 60.60 | | −.0009 |
| 5 | 1.55115 | 49.68 | | +.0064 |
| 6 | 1.60311 | 60.60 | | −.0009 |
| 7 | 1.61340 | 44.30 | | +.0182 |
| 10 | 1.75693 | 31.80 | | |
| | | | 147.7 | |

F = 1000, Aperture F/8, 17.2 Degrees Field of View
Stop Position : 63.8 after R8
$\frac{FVD}{F} = 0.945$
Lens group focal lengths:
$\frac{I}{+0.41F} \quad \frac{II}{-0.33F} \quad \frac{III}{+1.0F}$

EXAMPLE 2.2

| Element | Surface | Radius of Curvature | Axial Thickness/ Separation |
|---|---|---|---|
| 1 | R1 | +587.841 | |
| | | | 15.876 |
| | R2 | PLANO | |
| | | | 0.937 |
| 2 | R3 | +363.944 | |
| | | | 23.204 |
| | R4 | −501.857 | |
| 3 | | | 11.015 |
| | R5 | +414.214 | |
| | | | 0.937 |
| | R6 | +264.645 | |
| 4 | | | 21.006 |
| | R7 | −711.612 | |
| 5 | | | 10.312 |
| | R8 | +378.020 | |
| | | | 71.381 |
| 6 | R9 | −2216.861 | |
| | | | 12.945 |
| | R10 | −253.494 | |
| 7 | | | 8.906 |
| | R11 | +218.971 | |
| | | | 184.053 |
| 10 | R12 | −3864.069 | |
| | | | 15.876 |
| | R13 | −544.492 | |
| | | | 569.827 |

| Element | Refractive Index Nd | Constringence V | Diameter | Δ Pcs |
|---|---|---|---|---|
| | | | 142.6 | |
| 1 | 1.60311 | 60.60 | | −.0009 |
| 2 | 1.60311 | 60.60 | | −.0009 |
| 3 | 1.55115 | 49.68 | | +.0064 |
| 4 | 1.60311 | 60.60 | | −.0009 |
| 5 | 1.55115 | 49.68 | | +.0064 |
| 6 | 1.60311 | 60.60 | | −.0009 |
| 7 | 1.61340 | 44.30 | | +.0182 |
| 10 | 1.64831 | 33.84 | | |
| | | | 142.8 | |

F = 1000, Aperture F/8, 17.2 Degrees Field of View
Stop Position : 64.2 after R8
$\frac{FVD}{F} = 0.946$ Lens group focal lengths:
| I | II | III |
|---|---|---|
| +0.41F | −0.32F | +0.99F |

EXAMPLE 2.3

| Element | Surface | Radius of Curvature | Axial Thickness/ Separation |
|---|---|---|---|
| 1 | R1 | +497.531 | |
| | | | 14.050 |
| | R2 | −5924.950 | |
| | | | 0.937 |
| 2 | R3 | +357.638 | |
| | | | 22.948 |
| | R4 | −551.772 | |
| 3 | | | 11.005 |
| | R5 | +408.826 | |
| | | | 0.937 |
| | R6 | +267.246 | |
| 4 | | | 23.416 |
| | R7 | −968.524 | |
| 5 | | | 10.303 |
| | R8 | +371.725 | |
| | | | 71.342 |
| 6 | R9 | −2455.218 | |
| | | | 12.176 |
| | R10 | −352.249 | |
| 7 | | | 8.898 |
| | R11 | +216.079 | |

-continued

| | | | |
|---|---|---|---|
| 10 | R12 | −4183.931 | 181.323 |
| | | | 15.863 |
| | R13 | −628.166 | |
| | | | 566.361 |

| Element | Refractive Index Nd | Constringence V | Diameter | Δ Pcs |
|---|---|---|---|---|
| | | | 141.0 | |
| 1 | 1.48749 | 70.41 | | +.0070 |
| 2 | 1.60311 | 60.60 | | −.0009 |
| 3 | 1.55115 | 49.68 | | +.0064 |
| 4 | 1.60311 | 60.60 | | −.0009 |
| 5 | 1.55115 | 49.68 | | +.0064 |
| 6 | 1.60311 | 60.60 | | −.0009 |
| 7 | 1.61340 | 44.30 | | +.0182 |
| 10 | 1.74950 | 34.95 | | |
| | | | 142.9 | |

F = 1000, Aperture F/8, 17.2 Degrees Field of View
Stop Position : 60.6 after R8
$\frac{FVD}{F} = 0.9396$ Lens group focal lengths:
| I | II | III |
|---|---|---|
| +0.41F | −0.32F | +0.99F |

I claim:

1. A telephoto lens comprising a positive front group of lens elements including at least one positive doublet consisting of a positive element of a crown glass type in front of a negative element of a flint glass type having a positive red relative partial dispersion coefficient deviation, a negative middle group of lens elements comprising a positive lens element of a crown glass type and a negative lens element of a flint glass type having a positive red relative partial dispersion coefficient deviation, a rear positive part comprising at least one lens element well separated from the negative middle group, and an aperture stop for limiting the light rays from said front group of lens elements which are transmitted through said middle group of lens elements.

2. A telephoto lens as claimed in claim 1 wherein the separation of the rear positive part of the lens from the negative middle group is the largest air gap in the lens.

3. A telephoto lens as claimed in claim 2 wherein the said separation is in the range 0.12F to 0.24F where F is the focal length of the complete lens.

4. A telephoto lens according to claim 1 wherein the rear positive part of the lens consists of a single positive lens element of a flint glass having a refractive index in the range 1.64 to 1.76 and a V value in the range 36 to 31.

5. A telephoto lens according to claim 1 wherein the rear positive part consists of a doublet comprising a negative lens element in front of a positive lens element, the negative element being of a glass type having a lower refractive index and a higher V value than the glass type of the positive element.

6. A telephoto lens as claimed in claim 5 wherein the said negative element is of a glass type having a refractive index in the range 1.50 to 1.63 and a V value in the range 61 to 38 and the said positive element is of a glass type having a refractive index in the range 1.68 to 1.76 and a V value in the range 45 to 29.

7. A telephoto lens according to claim 5 wherein the glass type of the negative element has a red relative partial dispersion coefficient deviation which is more negative than that of the glass type of the positive element.

8. A telephoto lens according to claim 5 wherein the doublet constituting the rear positive part of the lens is a cemented doublet.

9. A telephoto lens according to claim 1 wherein in the positive front group, the said positive lens element of a crown glass type which forms part of the positive doublet has a negative red partial dispersion coefficient deviation.

10. A telephoto lens according to claim 1 wherein in the positive front group, the positive element and the negative element of said positive doublet are cemented together to form a cemented doublet.

11. A telephoto lens according to claim 1 wherein in the positive front group, the positive element of a crown glass type which forms part of the said positive doublet has a refractive index in the range 1.55 to 1.65 and a V value in the range 57 to 65 and the negative element of a flint glass type which forms part of the said positive doublet has a refractive index in the range 1.52 to 1.62 and a V value in the range 44 to 52.

12. A telephoto lens according to claim 1 wherein the positive front group consists of five lens elements arranged to form three components consisting of a singlet positive element and two positive doublets each of which consists of a positive element of a crown glass type in front of a negative element of a flint glass type having a positive relative partial dispersion coefficient deviation at the red end of the visible spectrum.

13. A telephoto lens as claimed in claim 12 wherein the singlet positive element has a refractive index in the range 1.48 to 1.63 and a V value in the range 58 to 71.

14. A telephoto lens according to claim 12 wherein in each of the said two positive doublets, the positive lens element has a refractive index in the range 1.55 to 1.65 and a V value in the range 57 to 65 and the negative lens element has a refractive index in the range 1.52 to 1.62 and a V value in the range 44 to 52.

15. A telephoto lens according to claim 1 wherein, in the negative middle group of lens elements, the said positive element of a crown glass type has a refractive index in the range 1.60 to 1.70 and a V value in the range 54 to 61 and the said negative lens element of a flint glass type has a refractive index in the range 1.61 to 1.66 and a V value in the range 44 to 39.

16. A telephoto lens according to claim 1 wherein, in the negative middle group of the lens, the said positive lens element of a crown glass type has a negative red partial dispersion coefficient deviation.

17. A telephoto lens according to claim 1 wherein the said positive and negative lens elements in the middle group are cemented together.

18. A telephoto lens according to claim 1 wherein the negative middle group of the lens consists of the said positive and negative elements.

19. A telephoto lens according to claim 1 wherein the focal length of the positive front group of the lens is in the range +0.37F to +0.50F, the focal length of the negative middle group of the lens is in the range −0.30F to −0.37F and the focal length of the positive rear part of the lens is in the range +0.75F to +1.60F.

20. A telephoto lens according to claim 2 wherein the rear positive part of the lens consists of a single positive lens element of a flint glass having a refractive index in the range 1.64 to 1.76 and a V value in the range 36 to 31.

21. A telephoto lens according to claim 1 wherein the rear positive part of the lens consists of a single positive lens element of a flint glass having a refractive index in the range 1.64 to 1.76 and a V value in the range 36 to 31 wherein the separation of the rear positive part of the lens from the negative middle group is the largest air gap in the lens, and wherein the said separation is in the range 0.12F to 0.24F where F is the focal length of the complete lens.

22. A telephoto lens according to claim 2 wherein the rear positive part consists of a doublet comprising a negative lens element in front of a positive lens element, the negative element being of a glass type having a lower refractive index and a higher V value than the glass type of the positive element.

23. A telephoto lens according to claim 1 wherein the rear positive part consists of a doublet comprising a negative lens element in front of a positive lens element, the negative element being of a glass type having a lower refractive index and a higher V value than the glass type of the positive element, wherein the separation of the rear positive part of the lens from the negative middle group is the largest air gap in the lens and wherein the said separation is in the range 0.12F to 0.24F where F is the focal length of the complete lens.

24. A telephoto lens according to claim 6 wherein the glass type of the negative element has a red relative partial dispersion coefficient deviation which is more negative than that of the glass type of the positive element.

25. A telephoto lens according to claim 6 wherein the doublet constituting the rear positive part of the lens is a cemented doublet.

26. A telephoto lens according to claim 5 wherein the doublet constituting the rear positive part of the lens is a cemented doublet, wherein the said negative element is of a glass type having a refractive index in the range 1.50 to 1.63 and a V value in the range 61 to 38 and the said positive element is of a glass type having a refractive index in the range 1.68 to 1.76 and a V value in the range 45 to 29 and wherein the glass type of the negative element has a red relative partial dispersion coefficient deviation which is more negative than that of the glass type of the positive element.

27. A telephoto lens according to claim 2 wherein in the positive front group, the said positive lens element of a crown glass type which forms part of the positive doublet has a negative red partial dispersion coefficient deviation.

28. A telephoto lens according to claim 2 wherein the positive front group consists of five lens elements arranged to form three components consisting of a singlet positive element and two positive doublets each of which consists of a positive element of a crown glass type in front of a negative element of a flint glass type having a positive relative partial dispersion coefficient deviation at the red end of the visible spectrum.

29. A telephoto lens as claimed in claim 1 wherein said aperture stop is located between said front and said middle groups of lens elements.

30. A telephoto lens as claimed in claim 29 wherein said aperture stop is located closer to said middle group of lens elements than to said front group of lens elements.

* * * * *

UNITED STATES PATENT AND TRADEMARK OFFICE
CERTIFICATE OF CORRECTION

PATENT NO. : 4,183,626
DATED : January 15, 1980
INVENTOR(S) : Philip J. Rogers

It is certified that error appears in the above-identified patent and that said Letters Patent are hereby corrected as shown below:

Col. 5, line 21, after "stop" delete ")".

Col. 6, line 53, delete "+554.569" and substitute therefor --+554.369--.

Col. 7, line 66, delete "+0240" and substitute therefor --+.0240--.

Col. 7, line 67, delete "+0087" and substitute therefor --+.0087--.

Signed and Sealed this

Twentieth Day of November 1984

[SEAL]

Attest:

Attesting Officer

GERALD J. MOSSINGHOFF

Commissioner of Patents and Trademarks